United States Patent
Dagci et al.

(10) Patent No.: US 7,589,643 B2
(45) Date of Patent: Sep. 15, 2009

(54) VEHICLE SPEED MONITORING SYSTEM

(75) Inventors: Oguz H. Dagci, Sterling Heights, MI (US); Donald K. Grimm, Utica, MI (US); Varsha Sadekar, Sterling Heights, MI (US); Daniel J. Bartz, Lake Orion, MI (US); Sarmad Y. Hermiz, Troy, MI (US); William E. Hamilton, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 349 days.

(21) Appl. No.: 11/171,509

(22) Filed: Jun. 30, 2005

(65) Prior Publication Data
US 2007/0001830 A1    Jan. 4, 2007

(51) Int. Cl.
*G08G 1/09* (2006.01)
(52) U.S. Cl. .................. 340/905; 340/441; 340/936; 701/117; 701/119
(58) Field of Classification Search ........... 340/441, 340/905, 936; 701/93, 117, 119; 180/170; 246/182 R
See application file for complete search history.

(56) References Cited

U.S. PATENT DOCUMENTS

| | | | | |
|---|---|---|---|---|
| 3,544,958 | A * | 12/1970 | McIntire et al. | 340/936 |
| 4,867,536 | A * | 9/1989 | Pidsosny et al. | 349/78 |
| 5,452,870 | A * | 9/1995 | Heggestad | 246/182 R |
| 5,485,161 | A | 1/1996 | Vaughn | 342/357 |
| 5,781,103 | A * | 7/1998 | Gilling | 340/441 |
| 6,265,989 | B1 * | 7/2001 | Taylor | 340/901 |
| 6,462,675 | B1 * | 10/2002 | Humphrey et al. | 340/441 |
| 6,515,596 | B2 | 2/2003 | Awada | 340/905 |
| 6,675,085 | B2 * | 1/2004 | Straub | 701/93 |
| 6,728,605 | B2 | 4/2004 | Lash et al. | 701/1 |
| 6,778,074 | B1 * | 8/2004 | Cuozzo | 340/441 |
| 6,845,317 | B2 * | 1/2005 | Craine | 701/200 |
| 6,865,454 | B2 * | 3/2005 | Kane et al. | 701/19 |
| 6,957,131 | B2 * | 10/2005 | Kane et al. | 701/19 |
| 7,176,813 | B2 * | 2/2007 | Kawamata et al. | 340/995.13 |
| 2002/0126023 | A1 | 9/2002 | Awada | 340/905 |
| 2004/0049323 | A1 * | 3/2004 | Tijerina et al. | 701/1 |
| 2005/0083187 | A1 * | 4/2005 | Birman et al. | 340/438 |
| 2005/0264404 | A1 * | 12/2005 | Franczyk et al. | 340/441 |
| 2006/0028330 | A1 * | 2/2006 | Gallant et al. | 340/441 |

* cited by examiner

*Primary Examiner*—Daniel Wu
*Assistant Examiner*—Anne V Lai

(57) ABSTRACT

A method for monitoring vehicle speed is provided. The method includes receiving a current speed of a vehicle and a current speed limit associated with a current location of the vehicle. A current speed range is calculated by comparing the current speed of the vehicle to the current speed limit. Operator alert preferences including a caution range and a warning range are accessed. An alert responsive to the current speed range and to the operator alert preferences is communicated to the operator of the vehicle. The alert includes one or more caution attributes when the current speed range of the vehicle is within the caution range. The alert includes one or more warning attributes when the current speed range of the vehicle is within the warning range. The alert includes one or more at speed attributes when the current speed range of the vehicle is not within the caution range or the warning range.

3 Claims, 5 Drawing Sheets

VEHICLE SPEED MONITORING SYSTEM

BACKGROUND OF THE INVENTION

The present disclosure relates generally to a vehicle speed monitoring system, and more particularly, to providing a vehicle operator with different alerts when the vehicle is approaching an operator specified maximum speed and when the vehicle exceeds the operator specified maximum speed.

Speed limits and driving conditions along any given route may change frequently, particularly in urban settings. In addition, along a given route, speed limits may change according to the time of day, such as during school hours or rush hours.

The most widely used method of informing a vehicle driver of the speed limit of a particular road is through posted speed limit signs on the side of the road. However, it is easy for drivers to become distracted and not notice changes in speed limit sign postings. Moreover, when multiple speed limit signs are posted for a single section of a road (e.g., a school hour speed limit and a non-school hour speed limit), a driver must determine which speed is applicable.

Some vehicles utilize a global positioning system (GPS) along with a mapping software database to obtain the maximum speed limit associated with the current location of the vehicle. The maximum speed may be shown on a vehicle display, and an audio or visual alert may be provided when the driver exceeds the posted speed limit. This type of system is often referred to as a speed limit advisor system.

Vehicle operators have different tolerances for exceeding the speed limit. For example, some drivers may routinely travel ten miles over the speed limit while others may adhere strictly to the posted speed limit. It would be useful for a driver to be warned when the current speed of the vehicle is approaching an operator specified maximum speed. In addition, it would be useful for the driver to be further warned (in a manner that can be distinguished from the first warning) when the current speed of the vehicle has exceeded the operator specified maximum speed. This would give the driver an opportunity to slow the vehicle down before exceeding his or her preferred maximum traveling speed.

BRIEF DESCRIPTION OF THE INVENTION

According to one aspect of the invention, a method is provided for monitoring vehicle speed. The method includes receiving a current speed of a vehicle and a current speed limit associated with a current location of the vehicle. A current speed range is calculated by comparing the current speed of the vehicle to the current speed limit. Operator alert preferences associated with an operator of the vehicle are accessed. The operator alert preferences include a caution range and a warning range. An alert responsive to the current speed range and to the operator alert preferences is communicated to the operator of the vehicle. The alert includes one or more caution attributes when the current speed range of the vehicle is within the caution range. The alert includes one or more warning attributes when the current speed range of the vehicle is within the warning range. The alert includes one or more at speed attributes when the current speed range of the vehicle is not within the caution range or the warning range.

In another aspect of the invention, a system is provided for monitoring vehicle speed. The system includes an output device and a processor in communication with the output device. The processor including instructions for facilitating receiving a current speed of a vehicle and a current speed limit associated with a current location of the vehicle. A current speed range is calculated by comparing the current speed of the vehicle to the current speed limit. Operator alert preferences associated with an operator of the vehicle are accessed. The operator alert preferences include a caution range and a warning range. An alert responsive to the current speed range and to the operator alert preferences is communicated to the operator of the vehicle via the output device. The alert includes one or more caution attributes when the current speed range of the vehicle is within the caution range. The alert includes one or more warning attributes when the current speed range of the vehicle is within the warning range. The alert includes one or more at speed attributes when the current speed range of the vehicle is not within the caution range or the warning range.

In a further aspect of the invention, a computer program product is provided for monitoring vehicle speed. The computer program product includes a storage medium readable by a processing circuit and storing instructions for execution by the processing circuit for performing a method. The method includes receiving a current speed of a vehicle and a current speed limit associated with a current location of the vehicle. A current speed range is calculated by comparing the current speed of the vehicle to the current speed limit. Operator alert preferences associated with an operator of the vehicle are accessed. The operator alert preferences include a caution range and a warning range. An alert responsive to the current speed range and to the operator alert preferences is communicated to the operator of the vehicle. The alert includes one or more caution attributes when the current speed range of the vehicle is within the caution range. The alert includes one or more warning attributes when the current speed range of the vehicle is within the warning range. The alert includes one or more at speed attributes when the current speed range of the vehicle is not within the caution range or the warning range.

BRIEF DESCRIPTION OF THE DRAWINGS

Referring now to the figures, which are meant to be exemplary embodiments, and wherein the like elements are numbered alike.

DETAILED DESCRIPTION OF THE INVENTION

Exemplary embodiments of the present invention provide a caution message (visual, audio and/or haptic) to an operator of a vehicle when the current speed of the vehicle is approaching a driver specified maximum speed. In addition, a warning message (with different attributes than the caution message) is provided to the operator of the vehicle when the current speed of the vehicle has exceeded the driver specified maximum speed. This two step, or multiple stage alert, provides the operator with an opportunity to slow the vehicle down before exceeding his or her preferred maximum traveling speed.

For example, an operator may specify a caution range to include speeds ranging from the posted speed limit to ten miles over the posted speed limit. A caution attribute may include displaying a textual depiction of the current vehicle speed in a yellow text. Therefore, when the vehicle is traveling in the specified caution range, the current speed of the vehicle will be depicted in yellow text. The operator may also specify that a warning range includes any speed faster than ten miles over the posted speed limit and a warning attribute may include depicting the current speed of the vehicle in red blinking text. Therefore, when the vehicle is traveling in the specified warning range (e.g., eleven mph or more over the posted speed limit), the current speed of the vehicle may be displayed in blinking red text. Further, the at speed attributes (speeds not in the caution range or the warning range) may include depicting the current speed of the vehicle in green text. In this manner, the operator of the vehicle can have a visual depiction of the speed of the vehicle as compared to the current speed limit. This visual depiction may be utilized to assist the operator in keeping the vehicle speed within an operator specific comfort zone as specified by the operator in the caution and warning ranges.

Figure 1:
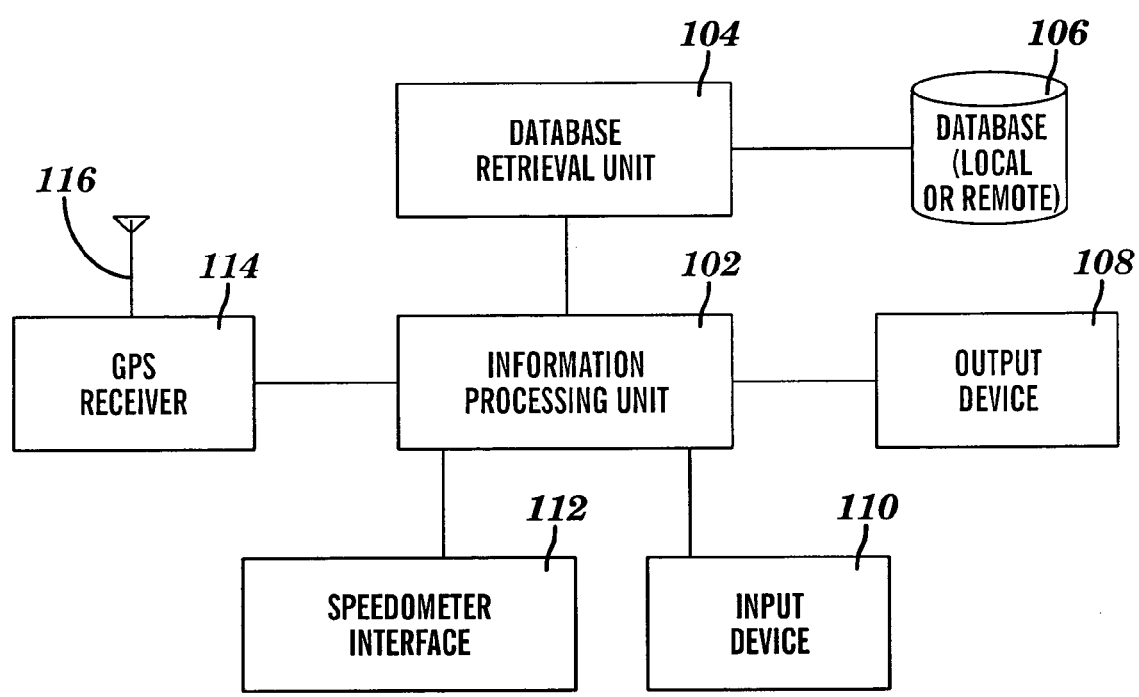
FIG. 1 is a block diagram of system that may be utilized by exemplary embodiments of the present invention to monitor vehicle speed.

FIG. 1 is a block diagram of system that may be utilized by exemplary embodiments of the present invention to monitor vehicle speed. An antenna 116 is connected to a GPS receiver 114, which determines the position of a vehicle based upon signals from GPS satellites received through the antenna 116. The GPS receiver 114 may be implemented by any commercially available GPS receiver such as those manufactured by Magellan Corporation of California and Motorola, Inc. of Illinois. The position information calculated by the GPS receiver 114 is sent to an information processing unit 102 (e.g., a microprocessor). Utilizing a GPS receiver 114 is one example of a manner of obtaining a geographic location and any manner of obtaining a geographic location may be utilized by exemplary embodiments of the present invention. Another way to obtain a geographic location is to utilize the triangulation of cellular or other mobile telephone signals to determine the geographic location of the vehicle.

The information processing unit 102 makes use of a database retrieval unit 104 to retrieve speed limit information based on the calculated geographic position of the vehicle from a database 106 of geographic locations and associated speed limits. The database 106 may be located in the vehicle, in which case the database retrieval unit 104 is locally connected to the database 106. The local database 106 may be periodically updated by a remote location transmitting updates. Alternatively, the database 106 may be at a remote location (i.e., not in the vehicle), so that a wireless remote communication link (e.g., via radio, network, and Internet) is established to communicate with the remote database 106. The vehicle requests and receives speed limit information from the remote database 106 for the calculated position of the vehicle via the communication link.

Information about a vehicle's current speed may be obtained through a speedometer interface 112 (or from any other available source) and reported to the information processing unit 102. The input device 110 is utilized to receive the operator alert preferences and may include text, touch screen, voice, etc. to facilitate the prompting and receipt of the preferences from the operator, or driver, of the vehicle. The output device 108 includes any device for communicating the results of the monitoring to the driver, or operator, of the vehicle. In exemplary embodiments of the present invention, the output device 108 is a display device such as the dashboard display, or instrument panel, of the vehicle. When the output device 108 is a display device 108, it is not limited to the dashboard display of the vehicle (e.g., may be a laptop computer display, and a mapping software or GPS display).

In alternate exemplary embodiments of the present invention, the output device 108 is an audio device including a speaker and speech software and/or other software to create audio alerts. In further exemplary embodiments, the output device 108 is a haptic alert device which generates a haptic alert signal to be sent, for example, to vibrate the steering wheel or to poke the operator of the vehicle via the seat pan. These examples are not meant to be limiting, and any haptic alert signal may be generated by the haptic alert device to warn the operator of a speed condition. In still further exemplary embodiments, the output device 108 combines two or more of a display device, an audio device and a haptic alert device.

The operator of the vehicle may decide to utilize the default operator alert preferences or the operator may decide to customize the default operator alert preferences via the input device 110. The operator may specify a caution range and a warning range. In addition, operator alert preferences may specify what type of alert the operator would like to receive based on the detected speed conditions. Alert types, or attributes, include but are not limited to: visual alerts (e.g., color, blinking, text, and light level), audio alerts, and haptic alerts (e.g., vibration, poking). Audio alert attributes may include volume, voice type, message type, etc. Haptic alert attributes may include the location and strength of the poking, the location and speed of the vibrating, etc. Haptic alerts may also include accelerator pedal force feedback and/or vibration. The input device prompts the operator to enter preferences for a multi-stage alert. In the exemplary embodiment describe herein, the preferences are entered for a two-stage alert, but any number of stages may be implemented by exemplary embodiments of the present invention.

In the two-stage alert, the first stage is referred to as a caution alert and the second stage is referred to as a warning alert. The caution alert warns the driver when the current speed of the vehicle is within a driver specified range, or caution alert range, of the speed limit. The warning alert warns the driver when the current speed of the vehicle is within another driver specified range, or warning alert range, of the speed limit. The information processing unit 102 prompts the operator to enter these values as well as preferences about how to be alerted (e.g., visual, audio, and haptic). Again, the operator may decide to utilize the default values. These default values may specify a caution alert range to include ten miles per hour below the speed limit, and a warning alert range to include one mile per hour over the speed limit and higher. Alternatively, the default values may specify a percentage. For example, the caution alert range may include from 90% of the speed limit to 100% of the speed limit and the warning alert range may include any speeds more than 100% of the speed limit.

Figure 2:
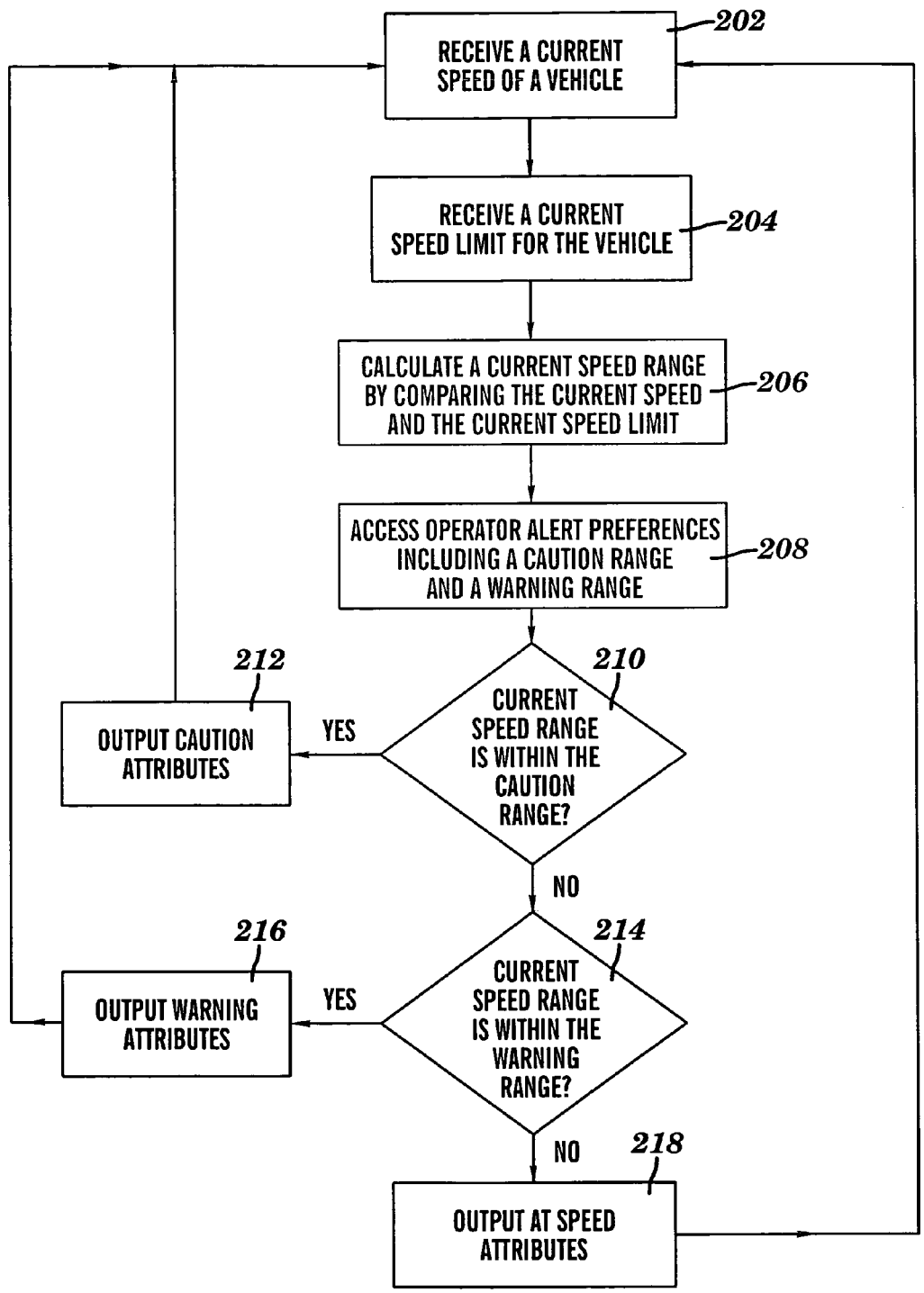
FIG. 2 is a process flow that may be implemented by exemplary embodiments of the present invention to monitor vehicle speed.

FIG. 2 is a process flow that may be implemented by exemplary embodiments of the present invention to monitor vehicle speed. The process flow is implemented by the information processing unit 102 to determine which attributes to include in an alert communicated to the operator. The attributes are determined based on the operator alert preferences and the current speed of the vehicle as compared to the current speed limit. At block 202, a current speed of the vehicle is received and at block 204, a current speed limit for the vehicle is received. The current speed limit may be calculated by a speed limit advisor system as described previously.

At block 206, a current speed range is calculated by comparing the current vehicle speed to the current speed limit. In an exemplary embodiment of the present invention, the current speed range is a numeric value. For example, if the current speed of the vehicle is 60 miles per hour (mph) and the current speed limit is 40 mph, then the current speed range is +20 mph, or 20 mph over the speed limit. In an alternate exemplary embodiment of the present invention, the current speed range is a percentage value. For example, if the current speed of the vehicle is 60 mph and the current speed limit is 40 mph, then the current speed range is 150% of the speed limit, or 50% over the speed limit. Exemplary embodiments of the present invention may utilize one or both of these methods when calculating a current speed range.

At block 208, operator alert preferences, including a caution range and a warning range, are accessed. Similar to the current speed range, the caution range and warning range may be represented as one or both of a numeric value and a percentage value. At block 210, it is determined if the current speed range is within the caution range specified by the operator alert preferences. If the current speed range is within the caution range specified by the operator alert preferences, then block 212 is performed to output caution attributes. In general, the caution range is the range just below the operator specified maximum speed, it is meant to warn the operator of the vehicle before the operator exceeds a specified maximum speed in relation to the speed limit. In an exemplary embodiment of the present invention, the caution attributes include vibrating the steering wheel in a gentle manner if the output device includes a haptic device. Alternatively, or in addition, the caution attributes include a gentle push back and/or gentle vibration pulses on the accelerator pedal if the output device includes a haptic device. If the output device includes an audio device a user specified message or user specified tone is output via the speakers. If the output device includes a display device, the color of the speedometer needle is set to a user specified color, such as yellow. After the processing in block has been completed, processing continues at block 202. In this manner, the current speed range is being updated on a regular basis. The regular basis may be determined based on the amount to time that has passed since the last time that block 202 was executed (e.g., every 10 seconds, every 30 seconds) and/or it may be determined based on the distance traveled by the vehicle since the last time that block 202 was executed (e.g., every half mile and every mile).

If the current speed range is not within the caution range specified by the operator alert preferences, as determined at block 210, then block 214 is performed to determine if the current speed range is within the warning range specified by the operator alert preferences. If the current speed range is within the range specified by the operator alert preferences, then block 216 is performed to output warning attributes. In general, the warning range is the range where the operator is exceeding an operator specified maximum speed (when compared to a current speed limit). In an exemplary embodiment of the present invention, the warning attributes include pushing back on the accelerator pedal in a more forceful manner (as compared to the push back specified by the caution attributes) and/or vibrating the accelerator pedal in a stronger manner (as compared to the vibration specified by the caution attributes) if the output device includes a haptic device. If the output device includes an audio device a user specified message or user specified tone is output via the speakers. If the output device includes a display device, the color of the speedometer needle is set to a user specified color, such as red and a text message may be displayed. After the processing in block has been completed, processing continues at block 202. In this manner, the current speed range is being updated on a regular basis. Again, the regular basis may be determined based on the amount to time that has passed since the last time that block 202 was executed (e.g., every 10 seconds, every 30 seconds) and/or it may be determined based on the distance traveled by the vehicle since the last time that block 202 was executed.

If the current speed range is not within the warning range specified by the operator alert preferences, as determined at block 210, then block 218 is performed to output at-speed attributes to the operator of the vehicle. This may be referred to as being at an at speed range. In general, the at speed range is the range where the operator is not approaching or exceeding the operator specified maximum speed (when compared to a current speed limit). In an exemplary embodiment of the present invention, the at speed attributes include no haptic output if the output device includes a haptic device. If the output device includes an audio device, the at speed attributes include no audio output. If the output device includes a display device, the color of the speedometer needle is set to a user specified color, such as green. After the processing in block 218 has been completed, processing continues at block 202. In this manner, the current speed range is being updated on a regular basis. Again, the regular basis may be determined based on the amount to time that has passed since the last time that block 202 was executed (e.g., every 10 seconds, every 30 seconds) and/or it may be determined based on the distance traveled by the vehicle since the last time that block 202 was executed.

Exemplary embodiments of the present invention provide a driver-vehicle interface (DVI) for analog speedometer gauges (either physical or virtual). In exemplary embodiments of the present invention, the current speed limit is highlighted prominently on the gauge. This may be accomplished in a variety of manners including, but not limited to, highlighting the numeric label on the dial, and by providing a tick mark or other symbol in the vicinity of the numeral. In exemplary embodiments of the present invention, the highlighting of the speed limit and the indication of the caution and/or warning is accomplished through backlighting of the gauge or via projection onto the gauge. For gauges that have the ability to render color, the vehicle speed may be highlighted on the gauge in a default color when no caution or warning is necessary.

When the vehicle exceeds (or approaches) the posted speed limit by an amount specified by the driver, an alert will be provided. If the current vehicle speed is in the driver specified cautionary range, the alert will include caution attributes including, for example, changing the highlighted vehicle speed color to a cautionary color, such as yellow. If the vehicle speed is in the warning range, the alert will include warning attributes such as, for example, changing the highlighted vehicle speed color to a warning color, such as red.

A tick mark may be inserted onto the speedometer to indicate the speed limit of the current road. In this exemplary embodiment, the driver can visually determine if the speed limit is being exceeded by examining the position of the needle in relation to the position of the tick mark. The tick mark can be implemented as a secondary physical needle that will swing to the new speed limit at the appropriate time. The tick mark may be implemented such that the tick mark will be highlighted (for example, a backlit LED) and a speed limit change will be indicated by setting the tick mark to the new speed. Alternatively, the tick mark can be animated to move from the old speed limit to the new speed limit.

Figure 3:
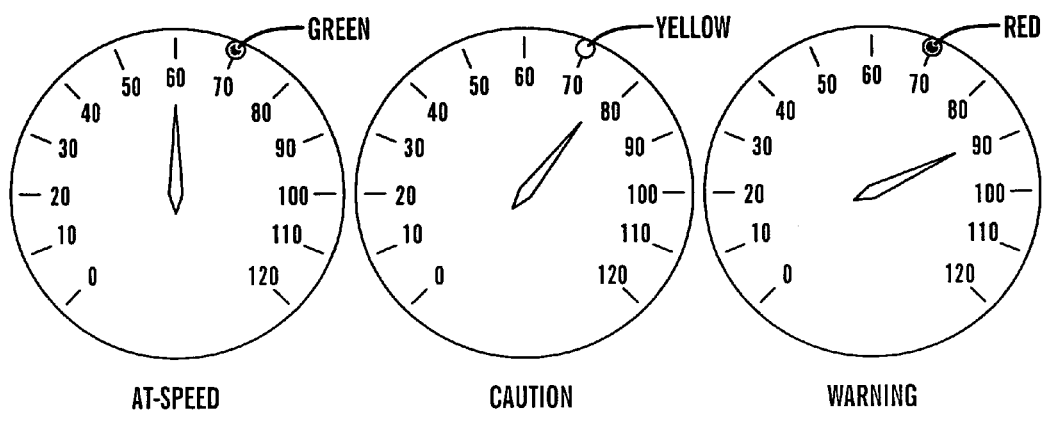
FIG. 3 is a user interface for an analog speedometer gauge that may be implemented by exemplary embodiments of the present invention.

FIG. 3 illustrates an exemplary embodiment of the present invention that utilizes a symbol located adjacent to the current speed limit to indicate the current speed limit as well as the current alert state of the application. In this implementation, visual highlighting techniques, such as LED backlighting or visual projection, will allow flexibility in the design of the symbol used to indicate the speed limit and alert state. As illustrated in FIG. 3, the speed limit is 70 mph. The symbol is green when the vehicle is traveling in the at speed range, yellow when traveling in the caution range, and red when traveling in the warning range.

It is also possible to change the color of the needle, or portions of it, to reflect the current alert state. In this implementation, the needle will remain in the default, or at speed, color as long as the vehicle speed is below the caution range. When the caution range is entered, the needle will change from the at speed color (e.g., green) to a cautionary color (e.g., yellow) or warning color (e.g., red) as required. The other possibility is to change the color of the needle continuously based on the vehicle speed. The color of the needle start at green when the vehicle is stationary. As the speed increases, the color of needle can be changed smoothly from green to yellow, from yellow to orange and from orange to red. The rate of color change can be determined based on the alert and warning speed limits. That kind of smooth color transition can be achieved using three-color (red, green, blue) LED whose color changes based on the duty cycle applied each of three color, since every color in nature is the combination of red, green and blue. For example, the color may change from green to light green, to a green yellow combination, to yellow to dark yellow, to orange, to light read and then to red. This smooth color transition may be applied to one or both of the speedometer needle and the display bar.

For speedometer gauges where color capability is not present or desired, the vehicle speed will be highlighted in the default color when the vehicle speed is below the caution range. In order to provide an alert indication to the driver when the vehicle speed has moved into the caution or warning range, the highlighted vehicle speed may flash. The flash rate can be specified by the driver as part of setting driver preferences. The vehicle speed may flash at a slow rate when in the caution range and a faster rate when in the warning range. The system may also be configured to flash the highlighted vehicle speed at a variable rate when entering the caution and/or warning ranges. For example, the flash rate may continue to increase as the vehicle moves into the warning range and continue to increase as the vehicle speed increases.

In alternate exemplary embodiments, the posted speed limit is highlighted on the gauge using one of the approaches described above, and an additional area of the console or instrument panel is utilized to indicate to the driver when the caution range and/or warning range has been entered. This may be accomplished through the use of a "slow down" message on an information display or by providing an icon on the gauge itself (e.g., a "down arrow" or "foot on brake" icon).

Figure 4:
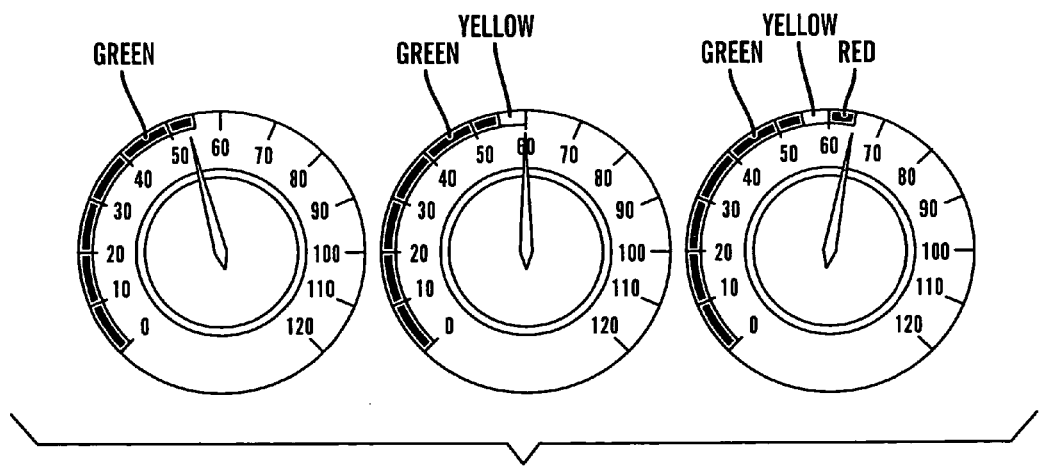
FIG. 4 is a user interface for an analog speedometer gauge that may be implemented by exemplary embodiments of the present invention.

FIG. 4 illustrates an exemplary embodiment of the present invention where the at speed, caution, and warning ranges are visible up to the needle of the gauge. In this example, the default color of green is utilized to indicate when the driver is in the at speed range. As the vehicle increases beyond the at speed range, an indication is provided that the vehicle speed has progressed into a cautionary or warning zone.

In cases where there is a speed limit change, and the new speed limit is less than the current speed limit, the system will advise the driver of the upcoming speed limit. This may be accomplished by displaying a secondary speed indication. For example, a message saying "50 mph ahead" may be presented on the speedometer.

In exemplary embodiments of the present invention, the output device 108 is a reconfigurable graphic display, such as a head-up display or other in-vehicle graphic display. For vehicles equipped with a color graphic display, the vehicle speed may be shown prominently in a default color when no speed advisory is necessary (i.e., when the vehicle is traveling in the at speed range). The current posted speed limit may also be shown on the display. In exemplary embodiments of the present invention, the current posted speed limit is depicted as in-vehicle signage that is representative of actual signs that are posted near the roadway. Other means of display may also be employed, such as displaying the speed limit on a separate information display or as simple text on the graphic display itself.

Figure 5:
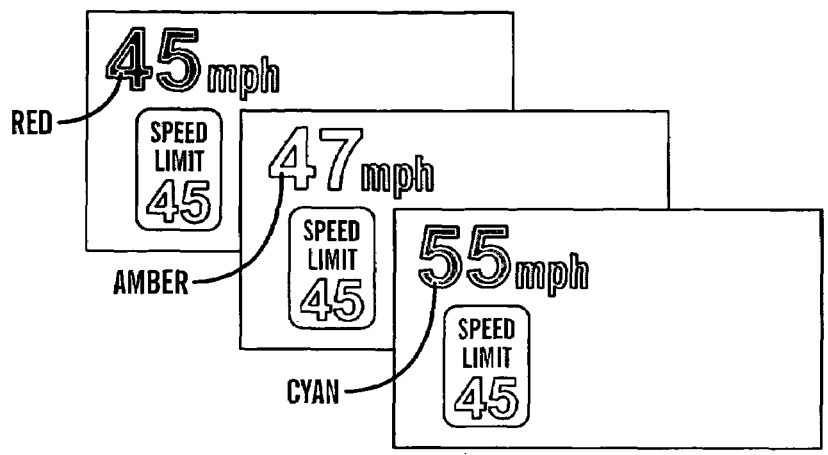
FIG. 5 is a user interface for a graphic display of vehicle speed that may be implemented by exemplary embodiments of the present invention.

When the vehicle enters the caution range, an alert containing caution attributes will be provided. In exemplary embodiments of the present invention, caution attributes include changing the display of the vehicle speed from green (the at speed range color) to yellow (the caution range color). When the vehicle enters the warning range, the vehicle speed color will change to red. Other color attributes, such as the one depicted in FIG. 5, include cyan for the at speed range, amber for the caution range, and red for the warning range.

For vehicles with a monochrome display, the vehicle speed may be displayed in the default color of the monochrome display when the vehicle is in the at speed range. If the driver enters the caution range, alert attributes may include flashing the vehicle speed at a slow rate. If the driver enters the warning range, alert attributes may include flashing the vehicle speed at a faster rate (as compared to the caution range flashing). The flash rate may continue to increase at a variable rate as the speed of the vehicle increases. The flash rate may be specified by the driver as part of setting the operator alert preferences or the default flash rate may be utilized.

In either color or monochrome displays, an alternative approach is to increase the point size of the displayed vehicle speed if the speed limit is exceeded. This may also be combined with warning colors for a greater effect in the case of color displays. Other potential ways of indicating excessive speed to the driver may include jittering the vehicle text, textually indicating that the driver should slow down (via a "slow down" message) or providing an icon that indicates that the driver needs to slow down (e.g., a "down arrow" or "foot on brake" icon).

Figure 6:
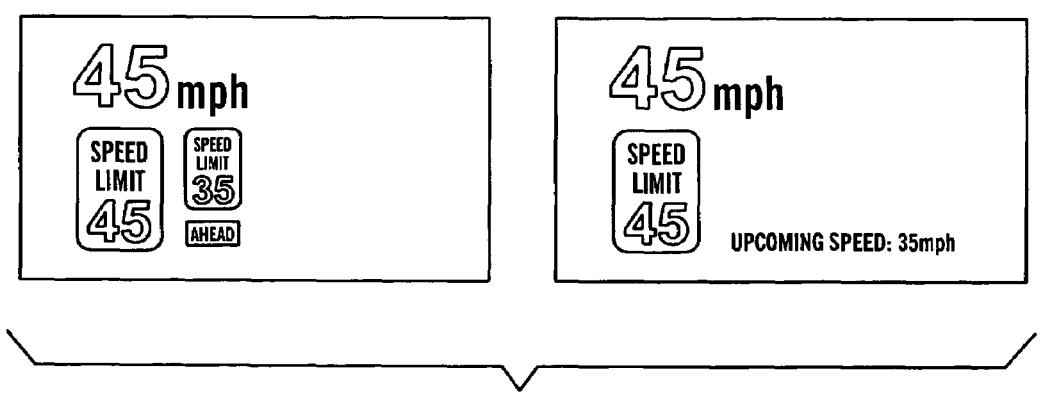
FIG. 6 is a user interface for a graphic display of vehicle speed that may be implemented by exemplary embodiments of the present invention.

In cases where there is a speed limit change, and the new speed limit is less than the current speed limit, the system will advise the driver of the upcoming speed limit. This may be accomplished by displaying additional in-vehicle speed limit signage or by arbitrary text as shown in FIG. 6. An alternative method of indicating to the driver that there is an upcoming slower speed is to blink the speed limit display with the upcoming speed limit.

Figure 7:
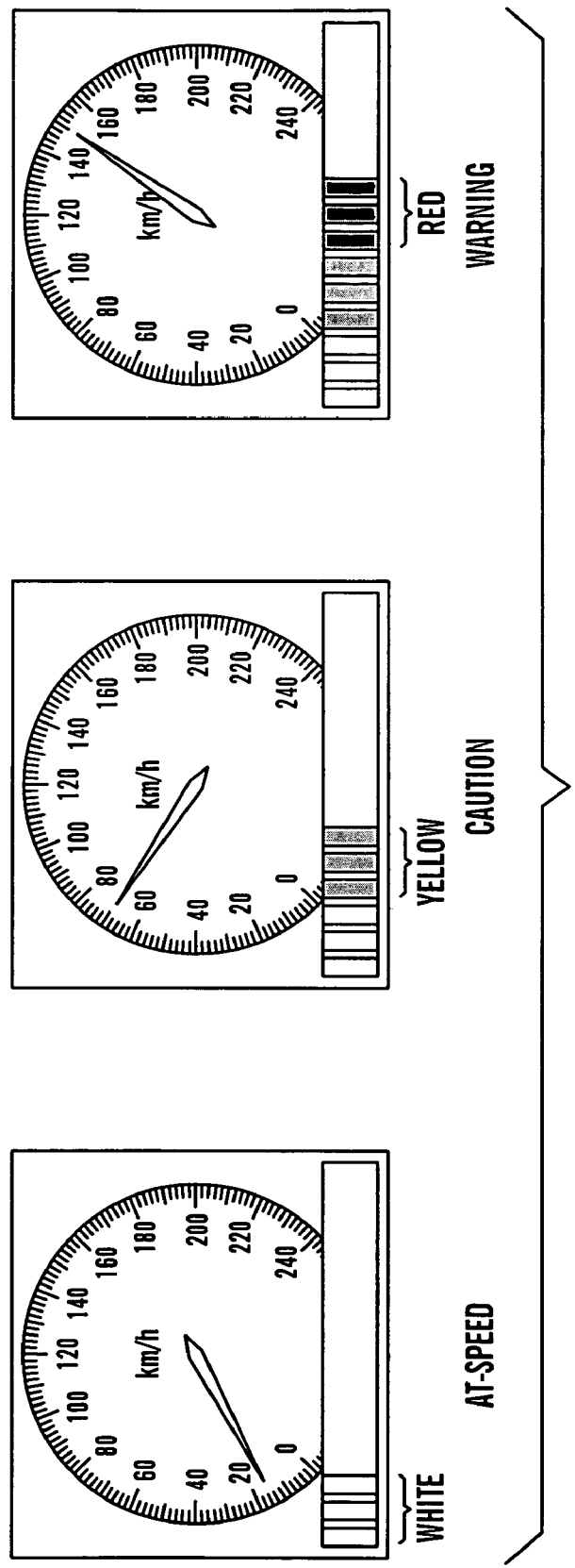
FIG. 7 is a user interface for a combination speedometer gauge and graphic display of vehicle speed that may be implemented by exemplary embodiments of the present invention.

FIG. 7 is a user interface for a combination speedometer gauge and graphic display of vehicle speed that may be implemented by exemplary embodiments of the present invention. A bar chart is displayed at the bottom of the speedometer gauge to indicate whether the vehicle speed is in the at speed, caution or warning range. The graphic display of FIG. 7 includes a discrete transition from green to red. The user interface shown in FIG. 7 may also be implemented by a smooth color transition from green to red (or any other color combination). For example, the color may transition from green to light green, to a green yellow combination, to yellow to dark yellow, to orange, to light read and then to red. This smooth color transition may be applied to one or both of the speedometer needle and the display bar.

The previous examples of user interfaces for analog speedometer gauges (either physical or virtual) and graphic displays are not intended to be limiting, but are intended to be illustrative of the types of user interfaces that may be implemented by exemplary embodiments of the present invention.

In alternate exemplary embodiments of the present invention, an operator may specify different ranges for different types of roads (e.g., highways, country road, city road) and for different speed limits. For example, one caution range may be desirable at lower speeds and another at higher speeds. The caution and/or warning ranges may continuously vary as the vehicle moves from a lower speed to a higher speed or it may vary in response to different current speed limits. Further, the caution range and/or warning ranges may vary depending on the time of day. For example, the caution range may be lower (as compared to the current speed limit) when driving in the middle of the night than it is when driving in the middle of the day.

In alternate exemplary embodiments of the present invention more than two ranges are specified by the operator. In addition, the ranges may warn the operator of the vehicle if the vehicle speed is under a minimum speed limit for a road (e.g., on a highway).

In alternate exemplary embodiments of the present invention, the amount of time spent in one or more of the at speed range, the caution range and the warning range may be tracked and stored.

As utilized herein the term vehicle may apply to any operator operated transportation device such as automobiles, motorcycles, boats, airplanes, trains, etc.

Exemplary embodiments of the present invention may be utilized to communicate a status of the current vehicle speed as compared to a current speed limit to the operator of the vehicle. In this manner, the operator does not have to interpret or view every speed limit sign posted on the roadway in order stay within the posted speed limits. In addition, the operator may enter two or more ranges for cautions and warnings that may allow the vehicle operator to stay within his or her speed comfort zone when operating the vehicle.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for monitoring vehicle speed, the method comprising:
   receiving a current speed of a vehicle;
   receiving a current speed limit associated with a current location of the vehicle;
   calculating a current speed range by comparing the current speed of the vehicle to the current speed limit;
   accessing operator alert preferences associated with an operator of the vehicle, wherein the operator alert preferences include a caution range and a warning range; and
   communicating an alert to the operator of the vehicle via an output device that includes a haptic device, the alert responsive to the current speed range and to the operator alert preferences, wherein:
      the alert includes one or more caution attributes when the current speed range of the vehicle is within the caution range;
      the alert includes one or more warning attributes when the current speed range of the vehicle is within the warning range; and
      the alert includes one or more at speed attributes when the current speed range of the vehicle is not within the caution range or the warning range; and
      wherein the communicating includes generating a haptic alert signal to activate at least one of a vibration and a poke of the haptic device.

2. A system for monitoring vehicle speed, the system comprising:
   an output device including a haptic device; and
   a processor in communication with the output device, the processor including instructions for facilitating:
      receiving a current speed of a vehicle;
      receiving a current speed limit associated with a current location of the vehicle;
      calculating a current speed range by comparing the current speed of the vehicle to the current speed limit;
      accessing operator alert preferences associated with an operator of the vehicle, wherein the operator alert preferences include a caution range and a warning range; and
      communicating an alert to the operator of the vehicle via the output device, the alert responsive to the current speed range and to the operator alert preferences, wherein:
         the alert includes one or more caution attributes when the current speed range of the vehicle is within the caution range;
         the alert includes one or more warning attributes when the current speed range of the vehicle is within the warning range; and
         the alert includes one or more at speed attributes when the current speed range of the vehicle is not within the caution range or the warning range; and wherein the communicating includes generating a haptic alert signal to activate at least one of a vibration and a poke of the haptic device.

3. A computer program product for monitoring vehicle speed, the computer program product comprising:
a storage medium readable by a processing circuit and storing instructions for execution by the processing circuit for performing a method, the method including:
receiving a current speed of a vehicle;
receiving a current speed limit associated with a current location of the vehicle;
calculating a current speed range by comparing the current speed of the vehicle to the current speed limit;
accessing operator alert preferences associated with an operator of the vehicle, wherein the operator alert preferences include a caution range and a warning range; and
communicating an alert to the operator of the vehicle via an output device that includes a haptic device, the alert responsive to the current speed range and to the operator alert preferences, wherein:
the alert includes one or more caution attributes when the current speed range of the vehicle is within the caution range;
the alert includes one or more warning attributes when the current speed range of the vehicle is within the warning range; and
the alert includes one or more at speed attributes when the current speed range of the vehicle is not within the caution range or the warning range; and
wherein the communicating includes generating a haptic alert signal to activate at least one of a vibration and a poke of the haptic device.

* * * * *